G. JUENGST & C. BERNHARD.
Fire-Escape.

No. 209,971.

Patented Nov. 19, 1878.

Witnesses.

Inventors:
George Juengst
Charles Bernhard

G. JUENGST & C. BERNHARD.
Fire-Escape.

No. 209,971. Patented Nov. 19, 1878.

Fig. 2.

Witnesses.
R. Boeklen.
A. A. Hagin

Inventors.
George Juengst
Charles Bernhard

G. JUENGST & C. BERNHARD.
Fire-Escape.

No. 209,971. Patented Nov. 19, 1878.

G. JUENGST & C. BERNHARD.
Fire-Escape.

No. 209,971. Patented Nov. 19, 1878.

Fig. 12.

Witnesses.
R. Boekelen.
A. A. Hayen

Inventors.
George Juengst
Charles Bernhard

UNITED STATES PATENT OFFICE.

GEORGE JUENGST AND CHARLES BERNHARD, OF NEW YORK, N. Y.

IMPROVEMENT IN FIRE-ESCAPES.

Specification forming part of Letters Patent No. 209,971, dated November 19, 1878; application filed June 7, 1878.

*To all whom it may concern:*

Be it known that we, GEORGE JUENGST and CHARLES BERNHARD, both of the city, county, and State of New York, have invented a useful, new, and Improved Fire - Ladder, Hose-Elevator, and Safety-Bridge, of which the following is a specification, which is accompanied by drawings, in which—

In this invention the ladder or elevator has beams, or a beam, made of jointed chain-link sections, and the sections are pivoted together and made with rope-guides over the bending side or sides, in which a rope or ropes to control the position of the link is employed; and in connection therewith is employed a reel, with gearing for winding the same, and a chain or rope on said reel, operated by a windlass, to bind said beam-sections in winding upon said reel; and the rope or ropes along the beam-sections, to control their position, are secured with the top end to the top section, and with the lower end or ends to one or more windlasses. By this means a ladder, or elevator, or a bridge is obtained which can be made of great extension or elevation and strength. It is capable of erection in a very short space of time to a high structure for safe mounting in a direction vertical, inclined, horizontal, or curved; and, by employment of a check-rope or hooks upon a section or sections below the top section or sections, said section or sections above the check-rope are arranged to move or raise and lower from the windlass or windlasses to which said rope controlling the position of the beam-sections is attached; in consequence of which a hose with nozzle attached to the top of the elevator or ladder can be elevated and manipulated to force and direct the water suitable for extinguishing purposes from the base of the ladder without requiring the fireman to mount.

To enable those skilled in the art, we proceed to specify the construction of this invention, to enable others to make and use the same.

Similar letters of reference indicate corresponding parts in the several figures of the different sheets of drawings.

The letter A in the drawings indicates a suitable truck for transporting the ladder when employed for fire and analogous purposes. When not used for such purpose a stationary frame is employed instead of it. Said truck is made with two strong side beams, B B, which are combined at the aft part by a cross-piece, C, and at the forward part with the cross-piece D. The rear portions of said beams are carried each upon a strong wagon-spring, E, which is secured to and upon the hind axle of the truck, and the forward cross-piece is supported upon the fifth-wheel and its bolster, which are held upon the forward axle of the truck, and are combined by the usual king-bolt. In the space between said beams and said cross-pieces C and D is located a strong reel, F, the shaft F' of which passes through said beams and extends considerably on the one side, and carries upon it the wire-rope windlass-gear G.

The reel F consists of two large circular flanges, H H, firmly secured together by a number of stay-bolts, I, which are all set at an equal distance from each other and from the shaft F', and are of such length that proper space is had between said flanges H H to admit the ladder L between them. One of said flanges H has firmly secured upon its hub a large gear-wheel, H', which is engaged by a pinion, I', employed upon a hand-wheel arbor guided in a bearing, J, attached to the side of the beam B opposite said wheel H'. The outer end of said arbor carries a hand-wheel, J', for operating it. Said reel revolves loose upon its shaft F', and by the hand-wheel J' the reel is turned for winding the ladder upon it. For the purpose of stopping the reel from unwinding unduly a pawl, K, is employed, which has a hook to engage the teeth of the wheel H', and is pivoted to a plate, K', secured on the beam B.

The ladder L is constructed with two beams, M M, in which the steps or ladder-rounds L' are secured. The beams M M are made each in short sections or links M', each jointed and pivoted to the succeeding link until the full length of the ladder is obtained. The top link may be made longer, as shown, than the others, each joint being made with a tongue on the one part, fitted into the slot or fork of the other part or next link, and a pivot through both parts combines them. The ends of each part are made with a stop or cornered end on the front side, to butt against the opposite corner or seat of the other part, so that the joint cannot be bent beyond a straight line on the front side, while the rear sides of said ends are made rounded, and therefore bend readily over to that side of the ladder.

Each section is made up of two links, M' M', of equal lengths in each separate division, firmly secured together by the steps between them, so as to form a complete section of the ladder. Now, in order to control the bending of the sections of the ladder, there is employed upon the front side of each link of the beam two or more guide-posts or balusters, N N, which carry guide-tubes or hollow rails O, and through said tubes is passed a wire rope or chain, P. The heads of the posts N have opposite openings, in which said tubes O are firmly held, and the ends of the joining tubes meet and butt upon one another when placed or turned in a straight line; and the rope P passes from tube to tube, and is knotted or otherwise secured at the forward end of the top section after passing through its tube. The bottom end of each of the wire ropes P passes out from the bottom tube, O, into a curved guide-tube, Q, secured to the reel F, and after passing through the inner end, Q', of said tube it passes over a central drum, R, secured upon the reel-shaft F', and its end is secured firmly to said drum R. A pair of diagonal brace-rods is employed between the posts N of each link, to combine and improve the stability of said posts. The upper ends of the tubes are secured in strong eyes near the farther extremities of the uppermost section of the ladder.

Figures 7, 8, 9, 10, 15, 16, 17:
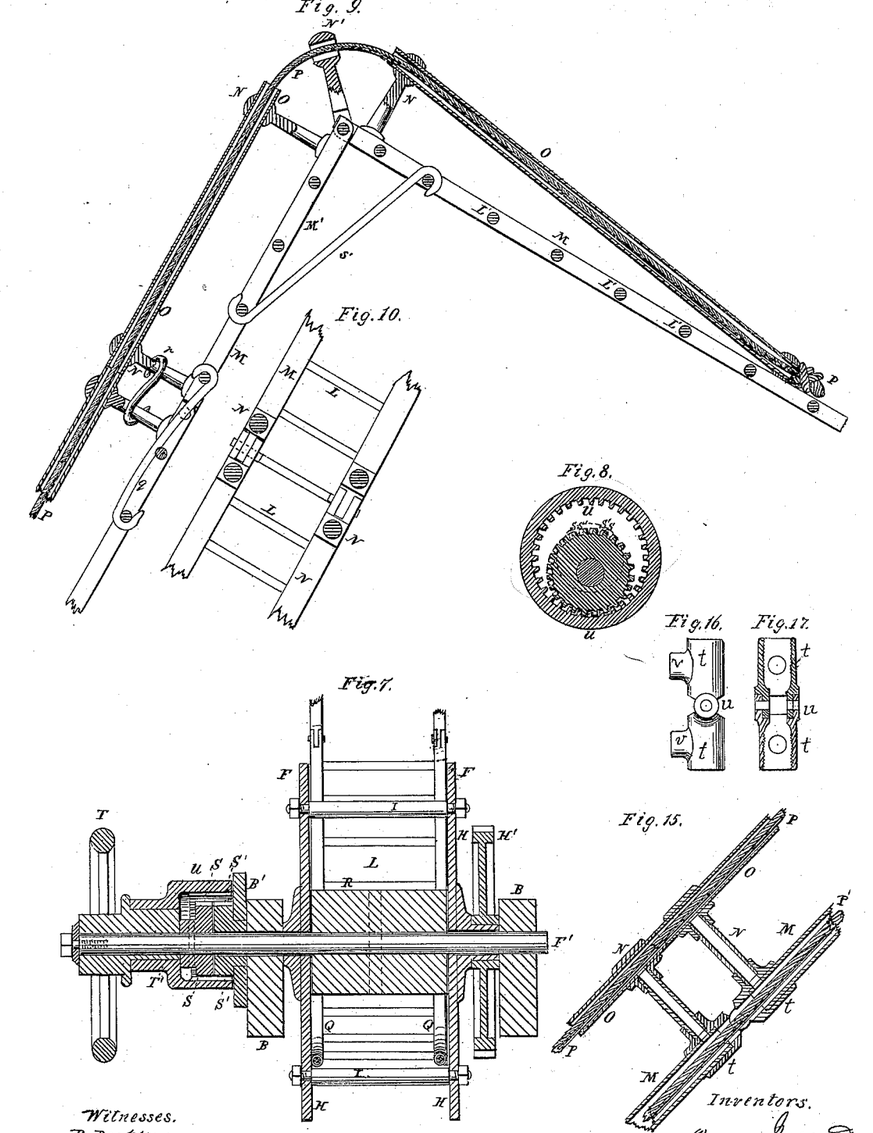
Fig. 7 is a detached central vertical longitudinal section of the wire-rope windlass - gear and reel of the same.
Fig. 8, a detached cross-section of the gear-wheels of the same.
Fig. 9, a detached longitudinal section of the top links of the ladder, showing its rope-guides bisected.
Fig. 10 represents a front view of the joint of two sections of the ladder.
Fig. 15, a similar section, but showing a safety-rope applied through the beam of the same.
Fig. 16 represents a detached side view of a pair of link-couplings of the beam of the same.
Fig. 17 is a longitudinal section of the same.

At junctions of the rails or tubes O, wherever the ladder is required to bend frequently and to an angle of less than about one hundred and fifty degrees, it is preferable to employ a third post, as shown in Fig. 9, having a bearing on the pivot of the beam-joint, and provided with a hollow head, fitting in between the butting ends of the tubes or rails, so as to guide the rope and prevent its being cut or chafed by the ends of the tubes. In these heads, and wherever desirable, rollers may be employed to relieve the friction.

The winding-drum R (see Fig. 7) is attached to the reel-shaft F', which has also connected to it a gear-wheel, S. Running loosely on the extremity of this shaft is a hand-wheel, T, having a portion of its hub formed into an eccentric, T'. Between the wheel S and the beam B, and firmly secured to the latter by the plate B', is a fixed gear-wheel, S', having one or more teeth in excess of wheel S. When the hand-wheel T is turned once the eccentric T', fitting loosely and turning in the sleeve of the hollow gear-wheel U, causes the teeth of said wheel U to engage with all the teeth of the gear-wheels S and S' in succession, thereby making said wheel S progress as many teeth forward as there are less teeth in it than there are in the wheel S'. The hub of the hand-wheel T has a shoulder to keep the hollow gear U engaged, and the hand-wheel T is held to the shaft F' by a screw and washer employed on the end of the shaft against it. By this means a very powerful windlass is obtained to wind the wire rope P and hold it firmly by hand through the wheel T. Several stay-bolts are employed between the guides Q to have them very substantially secured to the reel F. The inner ends, Q', of said guides are curved, to lead the ropes P tangentially to the periphery of the drum R. Their outer ends, Q, meet and butt against the bottom ends of the lowest rails when extended.

The links or sections M' for the first layer on the reel are made a little longer than the stay-bolts I are from each other, so that the sections may conveniently wind on the reel. The sections of the next layer are a little longer than the first sections, for the same reason. If more than two layers are used, the length of the added sections must be increased proportionably. The width of the ladder decreases toward the top, to allow the outermost layers to rest upon the inner layers between the beams. The beams, tubes, &c., are reduced in size toward the top of the ladder, to avoid unnecessary weight and strength. To keep the ladder against the reel and support it properly when erected, a strong upright post, V, with guide pulleys or rollers W and W', and a strong chain or rope, X, is employed, one end being secured to one of the stay-bolts I of the reel. Said rope passes over the bottom side of the reel, over the wound sections of the ladder, and up over the guide-roller W and through the slot V' in the post V, down under the guide-roller W', and over a windlass-drum, Y, under the rear cross-piece, C, and its second end is secured to said drum Y. The shaft of said drum Y has its bearings in two side plates, Z', each bolted to one of the beams B; and in the same plates is employed a counter-shaft, $a$, which serves to operate said drum and drum-shaft. It has for that purpose, either upon one or both ends, a hand-crank, $c$, and the drum-shaft has upon its outer end a large gear-wheel, Z, which is engaged by a pinion, $b$, upon the corresponding end of said shaft $a$, so that by means of the shaft $a$ the drum Y is turned, and the chain X wound or unwound upon it.

The post V is pivoted to a slotted eye-piece, $e$, by the pivot $d$, upon which also the roller W' is held. The eye-piece $e$ is firmly bolted to the cross-piece C, and a screw-rod, $f$, pivoted to the post V a distance above the roller W', is employed to determine the position relative to the ladder of said post. To operate the rod $f$ there is engaged with and over the rear portion of said rod a hand-wheel, $g$, the hub of which is threaded to fit the screw-thread of the rear of the rod $f$. Said hub of said wheel $g$ is fitted in a bearing-plate, $h$, which is secured to the rear side of the cross-piece C, and to each side of said plate $h$ is made a shoulder on said hub of the wheel, so that by turning the hand-wheel $g$ the rod $f$ is caused to draw the post to the desired position relative to the ladder.

Several of the posts V and ropes X may be employed for ladders of a large width with advantage. In most cases two may be preferred, to bind the ladder more evenly upon the reel than with the single rope and post; but when the ladder is made with three or more beams, two of the ropes or chains X and posts V are necessary to bind and hold the ladder equally to the reel.

When it is desired that one or more of the top sections be adjusted to a different angle from those below, or that the hose may be attached and worked from below, a check-rope, $o$, and cleat $p$, are employed. Said rope $o$ is secured on the section of the ladder below and next to those to be of the different angle, or to be used to work the hose-nozzle, as shown in Figs. 3, 4, 5, and 6, and said rope $o$ is secured by its lower end to the cleat $p$ at the rear portion of the cross-piece C. The sections of the ladder from the reel up to the section attached by the rope thereby become rigid, while those above may be adjusted or worked and raised and lowered by operating the rope P and its windlass G.

Figure 6:
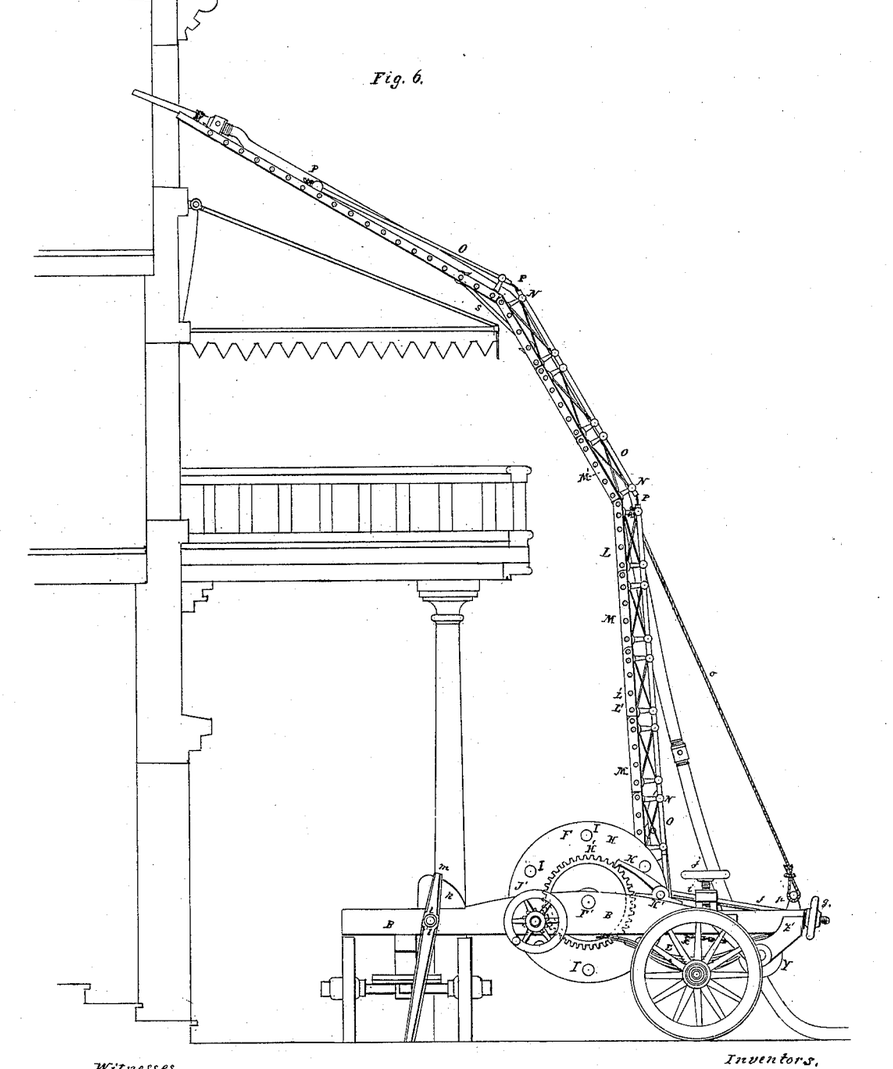
Fig. 6 represents a side elevation from the left-hand side of the same, showing the ladder fully extended, with a portion of its links checked by a rope and another portion by a hook, in such a manner that the ladder is erected in a curving direction, to avoid contact with the front fixtures of a building or awnings, and showing the hose attached to the ladder, operated from the street.

If several sections are required to be checked, simple hooks, $q$, $r$, and $s$, may be employed, which either engage over the steps of the ladder, as shown, by the hooks $s$, Figs. 9 and 6, or may engage the balusters, as shown at $r$ in Fig. 9.

To stop the truck at the desired location for operation, there is employed over the hind wheels, upon the cross-piece C, a cross-beam, $i$, and through the ends of the same, over the rims of the said wheels, are employed for each wheel adjusting brake-screws $j$, with hand-wheels on their top ends, which screws are turned down and forced upon the tires of the wheels, and thereby the wheels are stopped. Said screws also serve a secondary purpose, as with the same the truck and ladder is readily canted and adjusted laterally, either for the purpose of working the hose laterally or to regulate the ladder to a proper position required for operation. The springs E of the truck in such case allow a considerable canting motion of the truck.

The forward part of the truck has provision for adjusting the same to the proper level from the level or inclination of the street or place of operation. Said provision consists of a sliding rod, $l$, passed through the beams B across the truck. Said rod has its ends projecting on both sides of the beams B. Upon each end of said rod is employed a lever, $m$, one arm, $n$, of which is pointed, to gripe and lodge in the pavement or ground. The secondary arm of the same bears against the truck side, or, as shown, against a block, $k$, secured upon the truck. At each end of the rod $l$ a head or shoulder, $l'$, is formed, so that by spreading the levers in such a manner that their upper portion will bear against the shoulder $l'$ the forward end of the truck is readily braced and rigidly held in a desirable level for operation, notwithstanding the ground may be considerably out of level.

Figures 4, 13, 14:
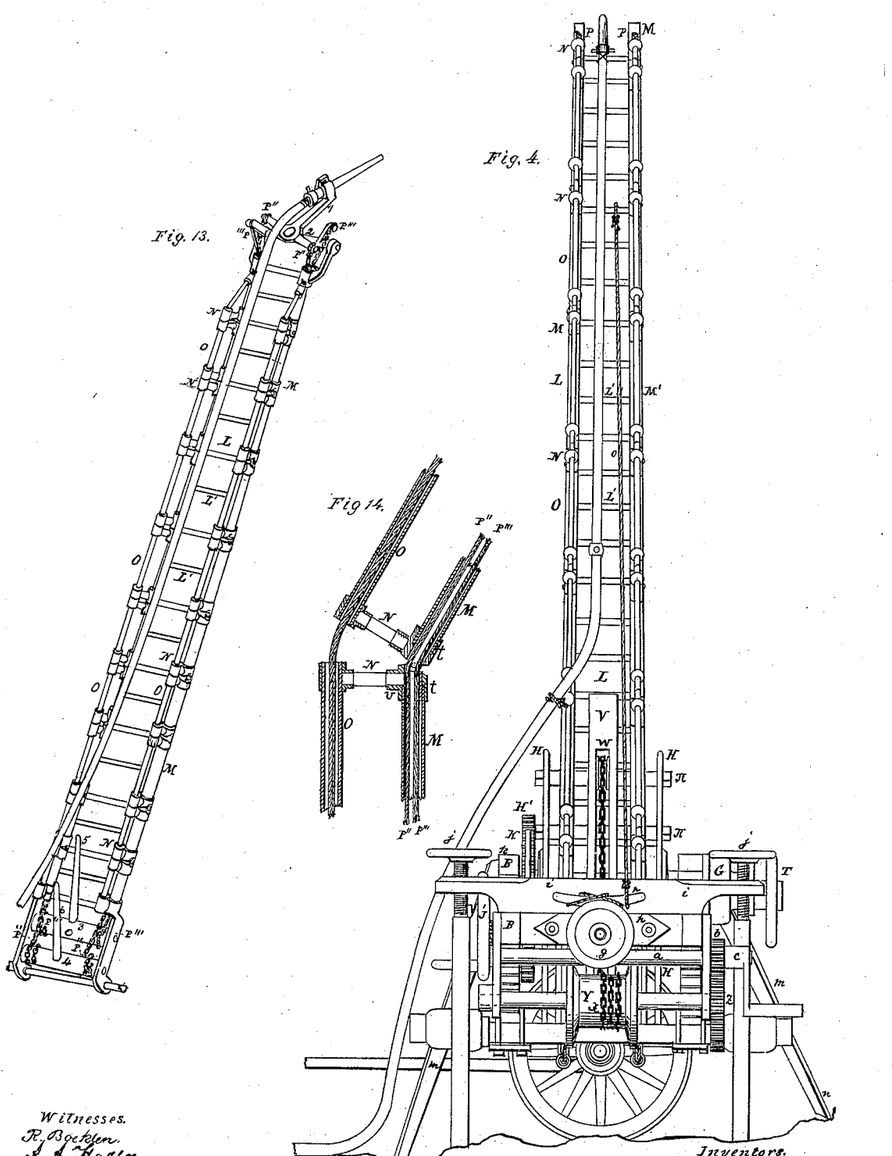
Fig. 4 is an end view of the same, showing the front of the ladder, with a hose attached.
Fig. 13 represents a modification of the ladder in perspective, and provided with the hose-manipulating devices.
Fig. 14 is a detached longitudinaal section of one of the beam-joints, showing a hollow beam and the ropes for operating the hoze - nozzle passing through said beam, a modification of the invention.
Figure 5:
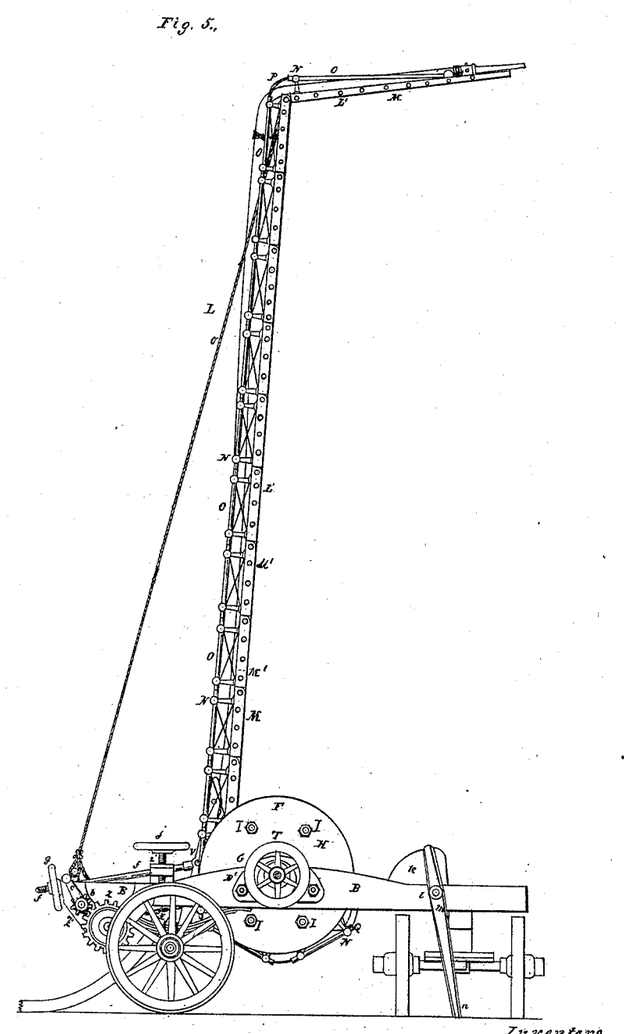
Fig. 5 is a side elevation of the same, more fully elevated, showing the right-hand side of it.

Instead of constructing the beams of the ladder solid, they may be preferred to be made hollow, and in such case constructed of pipe-sections, as shown in Figs. 13, 14, and 15. The adjoining ends of two sections of the beam are provided with a coupling, $t$, and each coupling has a rounded lip, $u$, on each side. The lips of one coupling are jointed to enter between the lips of the other. (Shown in Figs. 16 and 17.) By means of a central pivot through the lips said couplings are pivoted together, and their shanks are threaded to secure the pipe-sections therein. Said couplings have also shanks $v$, at right angle, for receiving the balusters N, which are also constructed of pipe, as shown, and the heads of the balusters are made similar, with T-couplings, to receive in one shank the guide-pipes O or rails, and in the other the top end of the pipe or baluster N, as clearly shown in Figs. 14 and 15. One object of having said beam-sections hollow is to make them very strong compared with their weight; but another object is to apply through said sections a rope for safety in case the pivots or any part of the joints should break. Said rope P′ provides against entire separation of the broken joint, and against accident by a separation of them. Said rope P′ is shown in Fig. 15.

The application of this invention not only relates to fire-escape ladders, but the essential features thereof may be used solely for elevating and manipulating hose, either with or without steps, &c., to fit the apparatus for use as a ladder.

Figures 11, 18:
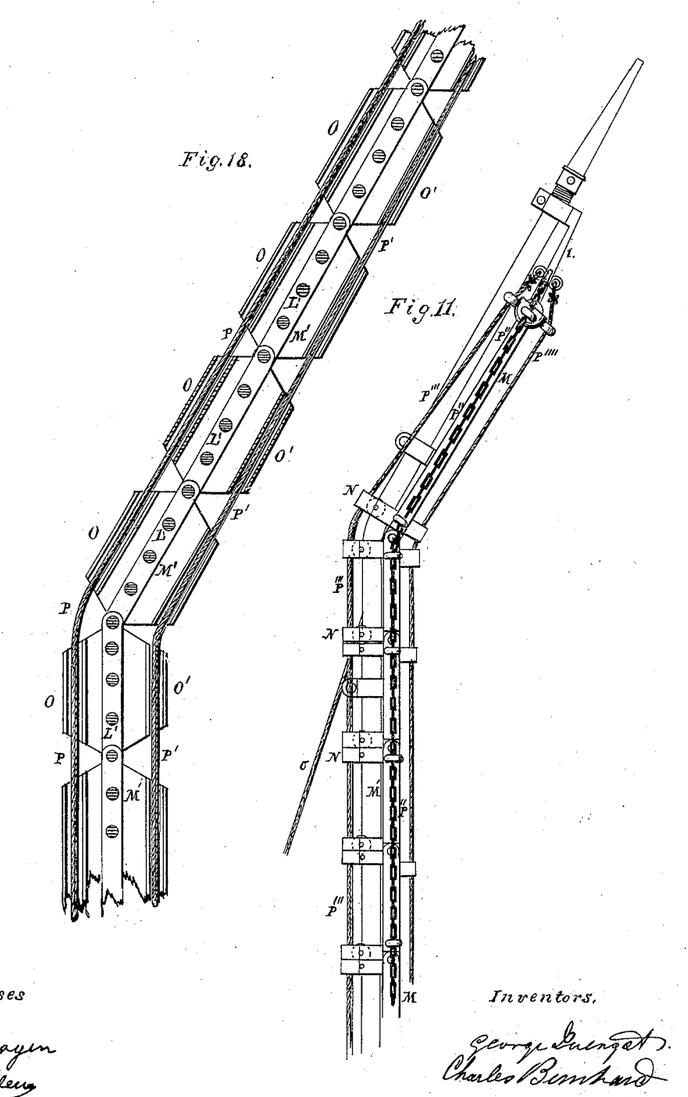
Fig. 11 is a side view of the upper portion of the ladder when used solely for elevating and manipulating the fire-hose, representing a modification of this invention.
Fig. 18 represents a modification of the ladder, having, instead of butting link-joints, beveled joints, with guides and guide-ropes on opposite sides, allowing the link-joints to turn in both directions.
Figure 12:
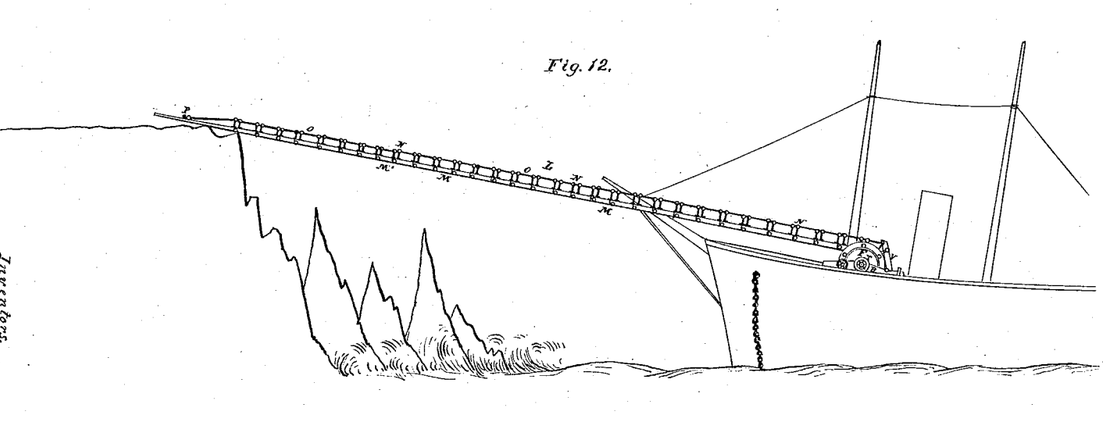
Fig. 12 represents a side view of the ladder on a smaller scale than in the former figures, and showing its application to a vessel for a safety-bridge.

When used principally for operating the hose, the nozzle of the hose is preferred to be attached to a separate lever, 1, which may be combined with the beam or ladder by a ball-joint, as shown in Fig. 11, or with a pivot to a secondary lever, 2, allowing it to produce motion on the hose-nozzle both longitudinally and laterally. The lever or levers to which the nozzle is connected have four ropes, P″ and P‴, attached, which ropes are carried along down the beam or beams, and are at the base connected with two drums, 3 and 4, so that by the joint operation of the pair of ropes attached to drum 3, which may be turned by lever 5, the nozzle is moved up or down in a vertical direction, and by the use of the secondary lever 6 upon the secondary drum 4 the nozzle is moved laterally or horizontally.

In Fig. 11 one beam is used to elevate the hose. Said beam is made in sections, pivoted, as before described.

The ropes for operating the hose-nozzle may be carried, as shown, in guides projecting from said beam in Fig. 11; or said ropes may be carried in the beam or beams when used hollow, as shown in Figs. 13 and 14.

Instead of having the beam-sections made to butt at their joints when brought home to a straight line on the front side of the ladder, the same may not butt, or may butt at an inclined position to one another, and in such case the said sections are provided with rope-guides O′ and a rope, P′, on the rear side of the ladder, as shown in Fig. 18. By this means both sides of the latter can be operated by the ropes P and P′, and the ladder bent to either side alike. In such case the said ropes may be either attached to a separate drum or both to the same drum, according to the purpose for which the beam or ladder is used, and which may be most convenient.

The ladder being capable of extending horizontally, it is applicable as a walk or a bridge as well as a means for elevating, and therefore convenient for connecting vessels with other vessels, or with docks or other landings, or for use in military and other operations, to pass cliffs and ravines, mount forts, &c.

When the same is applied as a hose-elevator, in case of fire the hose may be elevated and set in operation, the windows may be broken with the nozzle, and the stream of water or other extinguishing matter applied in less time than with the modes heretofore used, on account of not requiring the time for the firemen to mount and the advantage of operating directly from the street.

Figure 1:
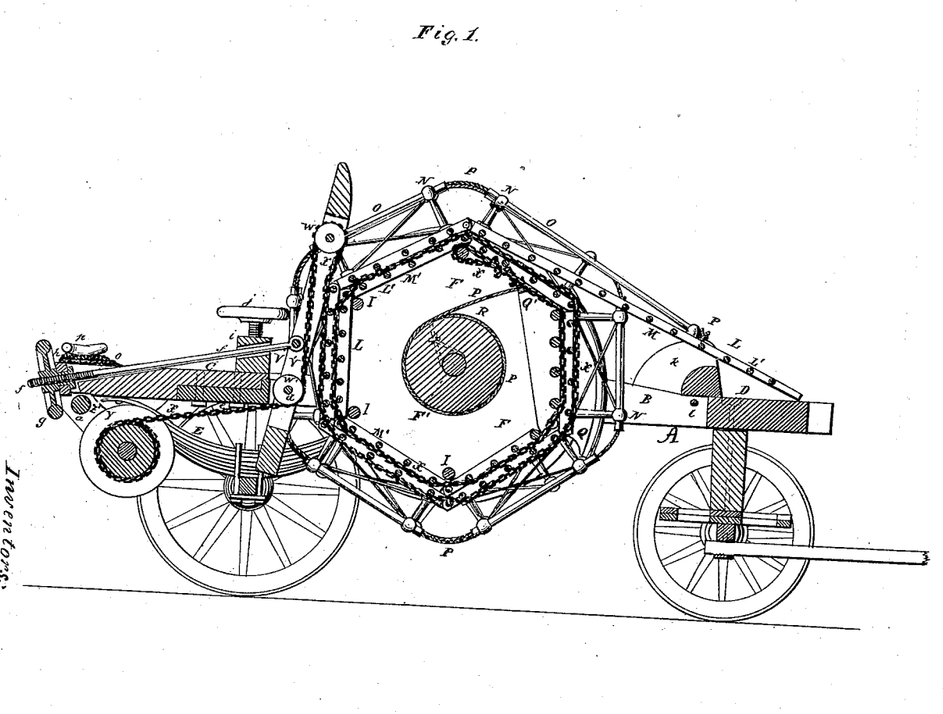
Figure 1 represents a vertical longitudinal central section of a fire-ladder according to this invention, and shown in the state ready for transportation or as going to the fire.
Figure 2:
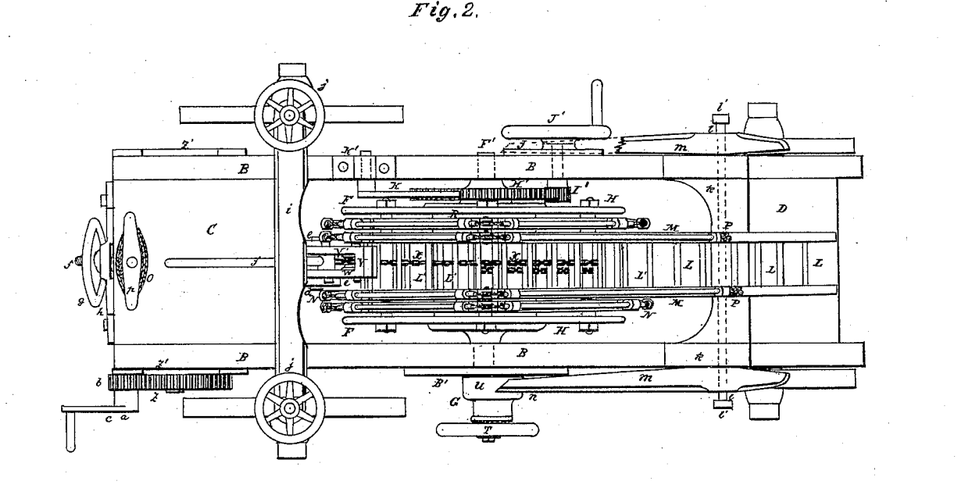
Fig. 2 is a top view of the same.
Figure 3:
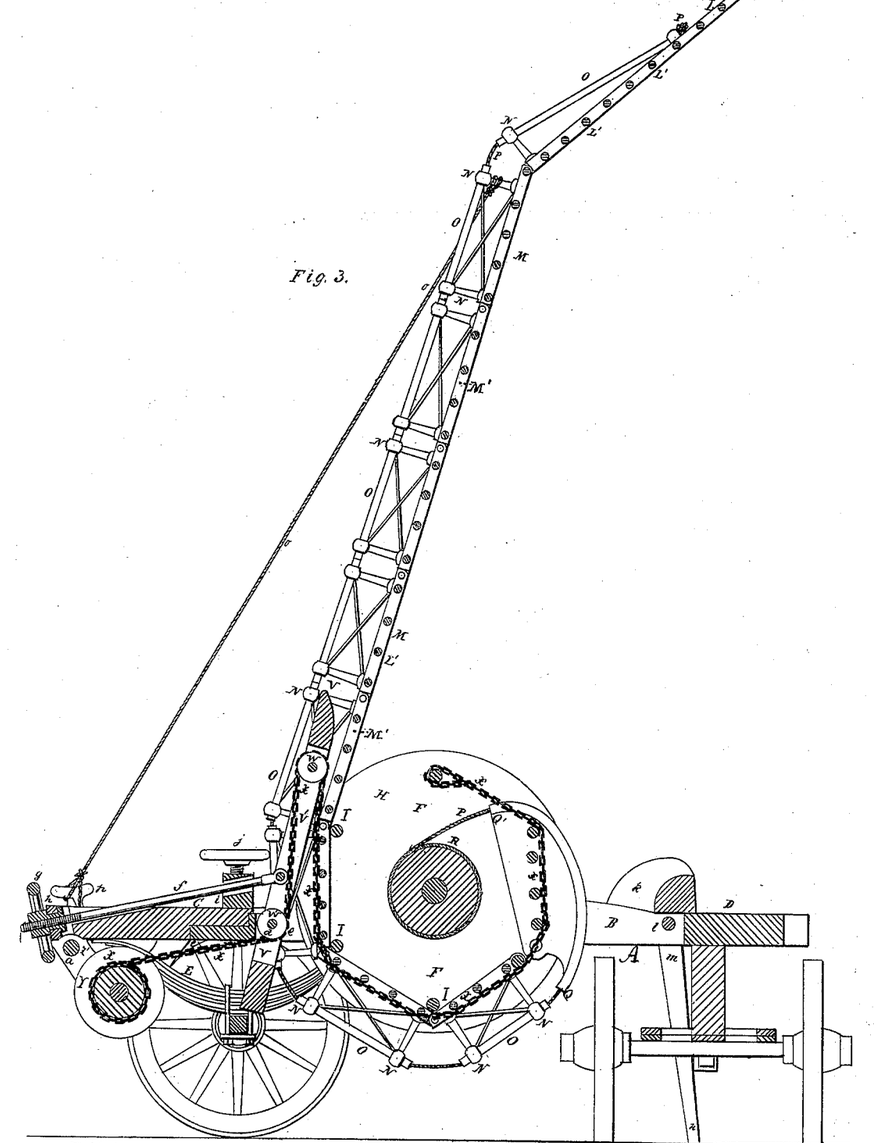
Fig. 3 is a vertical longitudinal section of the same, but shown partly elevated for operation at the fire.

The levers $m$ are turned and rested on the sides of beams B after operation for transportation, as shown in Figs. 1 and 2.

What we claim as our invention, and desire to secure by Letters Patent, is—

1. The combination of the reel F with the linked sectional beam or ladder, with the rope, ropes, or chains P, and the rope-guides and winding drum or device R, substantially as and for the purpose herein set forth.

2. The combination of reel F and pivoted link beam-sections, and the rope, ropes, chain, or chains P, with their guides and drum R, with the chain, chains or ropes X, and its drum Y, substantially as and for the purpose herein described.

3. The combination of the reel and pivoted link beam-sections M′, with the rope, ropes, or chain P, their guides O Q, the drum R, with the rope, ropes, or chains X, the guide-rollers W W′, drum Y, the post V, adjusting screw-rod $f$, and wheel $g$, substantially as and for the purpose herein stated and shown.

4. The combination of the reel F, with its gear H′, and pawl K, and pinion I′, the beam link sections M′, the rope or ropes P, the guides O and Q, and drum R, the rope X, its guide-rollers W and W′, the post V, and drum Y, and screw-rod $f$ with its hand-wheel $g$, and the check-rope $o$, substantially as and for the purpose herein mentioned.

5. The combination of the reel F, the jointed ladder L, rope or chain or chains P, and its guides O and Q and drum R, and the chain or rope X, its guide-rollers W and W′, the post V and drum Y, the rod $f$ and wheel $g$, and the winding-gear G with the hollow gear U, and the pawl K and pinion I and wheel H′, and the check-rope $o$, substantially as and for the purpose herein stated.

6. The combination of the truck A with the ladder L and the adjusting-screws $j$ and cross-beam $i$, and the hind truck-wheel and the springs E and reel F, substantially as and for the purpose herein set forth.

7. The combination of the ladder L and reel F, the truck A with its hind wheels and forward wheels, and with the levers $m'$ and the rod $l$ and its shoulders $l'$, and the blocks $k$, the beam $i$, and screws $j$, substantially as and for the purpose herein mentioned.

8. In combination with the reel F and its shaft F′, the wheels S and S′, and hollow gear U and eccentric T′, the drum R, rope or chains P, and guides Q and O, and the beam-sections M′, substantially as and for the purpose herein set forth.

9. In combination with the butt-link, pivoted beam-sections M′, of the rope, ropes, chain, or chains P, and guides O, substantially as and for the purpose herein shown and described.

10. The combination of the hose and nozzle with the linked beam-sections, the check-rope o, and the rope or chain P, with suitable guides O, with the reel F, and with truck A, substantially as and for the purpose herein set forth.

In witness whereof we hereunto set our hands this 3d day of June, 1878.

GEORGE JUENGST.
CHARLES BERNHARD.

In presence of—
R. BOEKLEN,
A. A. HAGEN.